United States Patent [19]

Ayres et al.

[11] Patent Number: 5,442,338

[45] Date of Patent: Aug. 15, 1995

[54] MINIATURE TELLTALE MODULE

[75] Inventors: John A. Ayres, Lapeer; David L. Ehle, Attica, both of Mich.

[73] Assignee: Nu-Tech & Engineering, Inc., Lapeer, Mich.

[21] Appl. No.: 56,087

[22] Filed: May 3, 1993

[51] Int. Cl.⁶ .............................................. G08B 5/00
[52] U.S. Cl. ..................... 340/815.64; 340/815.67; 40/426; 335/272
[58] Field of Search ............... 340/485, 486, 483, 484, 340/488, 561, 518, 524, 815.08, 815.26, 756, 782, 815.4, 815.45, 815.64, 815.67; 40/473, 493, 502, 532, 426; 361/284, 324; 192/30 W; 335/272

[56] References Cited

U.S. PATENT DOCUMENTS

| | | | |
|---|---|---|---|
| 1,823,319 | 9/1931 | Dickinson | 340/524 |
| 3,375,512 | 3/1968 | Watkins et al. | 335/272 |
| 3,660,814 | 5/1972 | Fales | 340/52 F |
| 3,835,450 | 9/1974 | Reck | 340/52 F |
| 3,839,701 | 10/1974 | Pomerantz | 340/52 F |
| 3,936,799 | 2/1976 | Hynes | 340/461 |
| 4,182,059 | 1/1980 | Greene | 40/493 |
| 4,446,810 | 5/1984 | Bressi | 40/493 |
| 5,028,900 | 7/1991 | DeWitt | 335/272 |
| 5,084,698 | 1/1992 | Sell | 340/762 |

OTHER PUBLICATIONS

SAE Techical Paper #930550 Miniature Telltale Module-Author Dave Ehle, Mar. 1, 1993, SAE.

Primary Examiner—Richard Hjerpe
Assistant Examiner—Chanh Nguyen
Attorney, Agent, or Firm—C. J. Fildes & Co.

[57] ABSTRACT

A miniature telltale module which combines a plurality of telltale functions into one unit and provides reduced cost per function. The module uses a miniature rotary actuator, a series of interconnected images and a single light source. The actuator allows a wide tolerances at the inputs while still precisely selecting the image positions. The actuator has a unique locking device (or brake) which automatically engages when power is removed. This feature allows the control circuitry to select an image with a momentary pulse and then remove the power from the actuator. Power consumption is thereby minimized since no power is required by the device except when changing the image to be displayed.

18 Claims, 5 Drawing Sheets

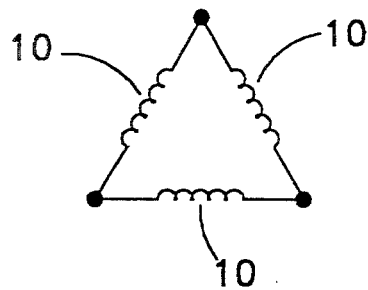
FIG. 2
| Actuator Inputs | | | Actuator Output |
| A | B | C | Position |
| --- | --- | --- | --- |
| – | H | L | 30° |
| H | – | L | 90° |
| H | L | – | 150° |
| – | L | H | 210° |
| L | – | H | 270° |
| L | H | – | 330° |
"–" INDICATES FLOATING INPUT
FIG. 3
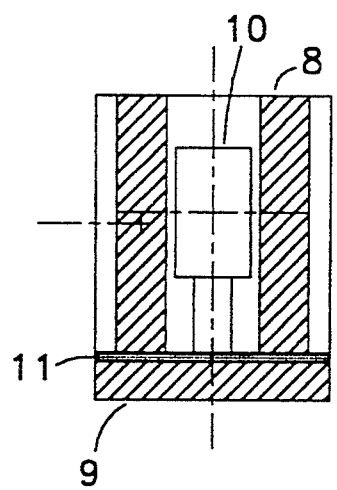
FIG. 4
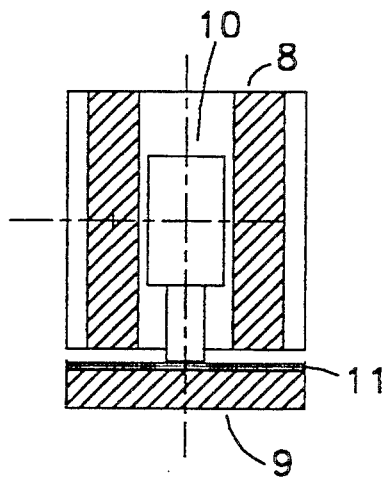
FIG. 5

MINIATURE TELLTALE MODULE

Cross-references to Related Applications: None
Statement as to right to inventions made under Federally sponsored research and development: Not Applicable.

BACKGROUND OF THE INVENTION

The field of the invention is generally that of indicators, and more specifically, to an improved miniature telltale module.

Most automotive instrument clusters contain fifteen to twentyfive warning or information indicators (telltales). Packaging these functions as part of an instrument cluster design inhibits the flexibility of the design and creates complexity throughout the assembly.

The instrument cluster housing typically provides the support for the telltale bulbs. The housing also incorporates complex structures to eliminate light leakage (or crosstalk) from adjacent telltales or into the instrument graphics areas.

Telltale bulbs are commonly powered through a flexible circuit which is placed on the back of the instrument case. The size and complexity of the flexible circuit required in each instrument is highly dependent on the telltale arrangement. Flexible circuits, therefore, add cost to the telltale function and increase the number of electrical connections thus decreasing the system reliability.

Current production instrument clusters contain a light bulb and socket for each telltale function. Material and assembly costs to install, test and inspect these bulbs accumulates into a significant portion of the instrument cluster cost because so many are needed. Incandescent bulb life and reliability continues to be an important factor even though bulb and socket design improvements have been made.

PRIOR ART

Several types of devices are known which have attempted to solve the problems stated above. By combining several telltale indications or messages into one unit, Pomerantz (3,839,701) and Reck (3,835,450) both taught the use of a D.C. Motor to rotate a message carrying drum using gears. Mechanical switches were incorporated to stop the motor at the required locations and a lamp was lighted to display the message or image. Both of these devices are complex electro-mechanical assemblies containing many parts, some of which are required to be precise (i.e. gears). This forces the cost of these devices to be high and thus they have not been used extensively.

Fales (3,660,814) teaches a simpler method of actuating a message carrying drum but like Pomerantz and Reck the assembly is large and therefore consumes too much space and thus is difficult to package within the instrument cluster. Also, the drum construction creates a large inertial load on the actuator thus requiring the Fales actuator to be heavily damped (with viscous fluid) to eliminate overshoot and ringing. This presents a response problem similar to the D.C. motor actuation and adds the need for the emergency indicator and it's required control logic. The extended period of time that the actuators are driven also increases the power consumption of the unit in fact Fales powers the actuator and the lamp all the time that a fault condition is signaled.

The cost and design flexibility problems of current approaches coupled with the fact that the prior art has not provided acceptable solutions calls for a new concept.

The present invention provides this new concept by disclosing a miniature telltale module that has the capability of containing a large number of images or messages. Further, this module is designed to be low cost and provides a variety of packaging options to enhance flexibility.

SUMMARY OF THE INVENTION

Generally speaking, the present invention comprises a novel miniature rotary actuator, a series of interconnected images and a single light source. The magnetic design of the miniature actuator allows wide tolerances at the inputs while still precisely selecting the image position.

The actuator also has a unique locking device (or brake) which automatically engages when power is removed. This feature allows the control circuitry to select an image with a momentary pulse and then remove the power from the actuator. Power consumption is thereby minimized since no power is required by the actuator except when changing the image to be displayed.

A series of images are carried on a continuous loop of transparent film and are guided between the light source (LED) and a simple projector lens.

The small size of the miniature telltale module allows instrument cluster designers to easily incorporate many telltales into instrument cluster designs while maintaining simple construction.

It is an object of the present invention to provide a novel miniature telltale module which optimize cost, packaging, control, power consumption and reliability.

It is a further object of the invention to provide a novel telltale module that is low in cost.

It is another object of the invention to provide a novel small package size to allow design flexibility within the instrument cluster.

It is a further object of the invention to provide simple control inputs to accurately select the required image which allows the module to be interfaced to sensor outputs with low cost circuitry.

It is another object of the invention to provide a device having low power consumption which is desirable to minimize heat dissipation within the cluster.

Further objects are implicit in the detailed description which follows hereinafter (which is to be considered as exemplary of, but not specifically limiting, the present invention) and said objects will be apparent to persons skilled in the art after a careful study of the detailed description which follows.

For the purpose of clarifying the nature of the present invention, one exemplary embodiment of the invention is illustrated in the hereinbelow-described figures of the accompanying drawings and is described in detail hereinafter. An alternative is also shown. Both are to be taken as representative of the multiple embodiments of the invention which lie within the scope of the invention.

BRIEF DESCRIPTION OF THE DRAWINGS

FIG. 2 is a schematic diagram of the stator coils of the actuator.

FIG. 3 is an actuator module truth table.

FIG. 4 is a cross sectional view of the actuator showing the actuator brake on when the power is off.

FIG. 5 is a cross sectional view of the actuator showing the actuator brake off when the power is on.

DESCRIPTION OF THE PREFERRED EMBODIMENTS

Figure 1:
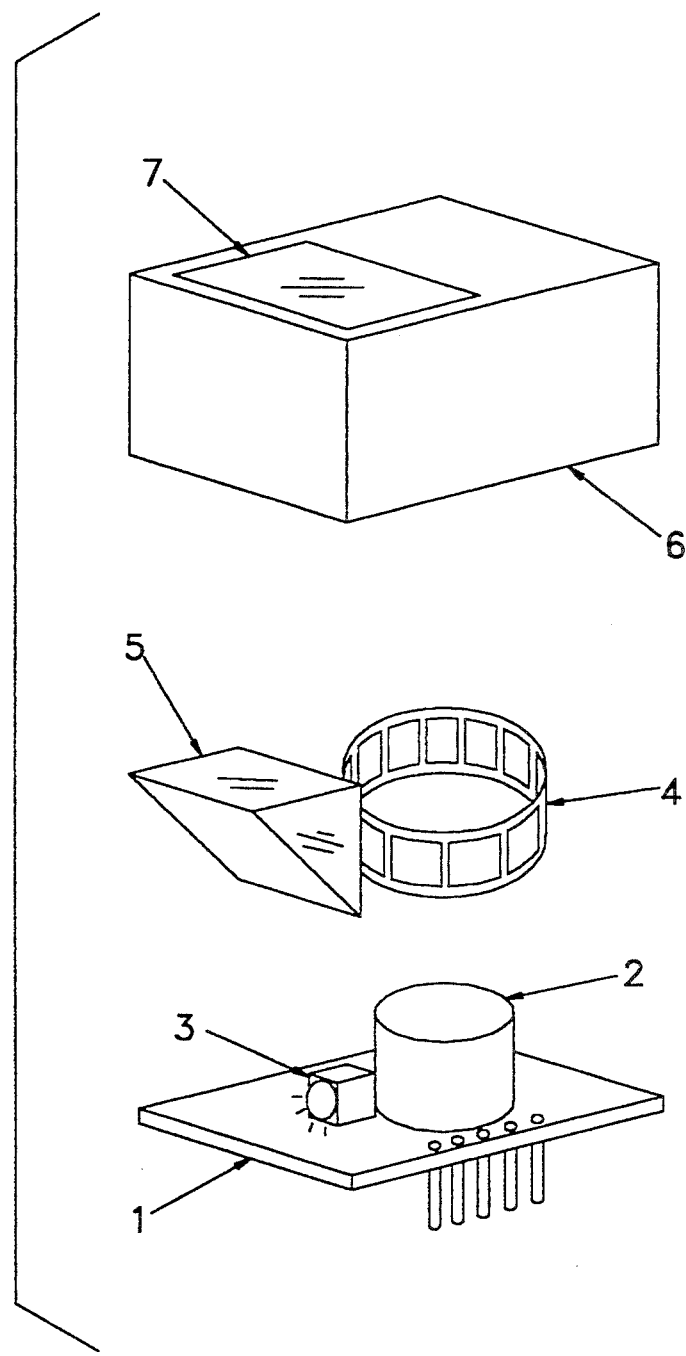
FIG. 1 is a perspective view showing one exemplary embodiment of one representative form of the invention.

Referring to FIG. 1, substrate 1 is used as a base and for electrical connections. An integrated circuit is fabricated into substrate 1. Alternately, an integrated circuit is contained on another circuit assembly to which substrate 1 is connected. Actuator 2 is mounted on substrate 1 by using glue. LED lamp 3 is soldered to substrate 1. Image strip 4 is placed around actuator 2 and LED lamp 3 and is held in place by the spacing of actuator 2 and LED lamp 3. Right angle optics 5 is fixedly attached to substrate 1.

A series of images are carried on image strip 4 and are guided between LED lamp 3 and right angle optics 5. Cover 6 is placed over substrate 1 and fixedly attached. Cover 6 has screen 7 which mounts adjacent to right angle optics 5 so that the images are projected (in focus) onto screen 7.

Referring to FIG. 2, actuator 2 has three inputs which are labeled A, B, and C. These inputs are the Delta connection points of the three stator coils 10.

Referring to FIG. 3, a truth table describes the relationship between actuator 2 inputs (A, B, and C) and the rotational position (or output) of magnet 8. The inputs have either a high (H), a low (L) or a floating input (-). By using three inputs for A, three inputs for B, and three inputs for C; six output positions for actuator 2 are obtained. Note that additional output positions may be obtained by using other binary or tri-state combinations for A, B, and C; Thus providing more than six output selections. The example of six positions is used here for clarity of description and should not be taken to limit the scope of the invention.

Referring to FIG. 4, actuator 2 is shown with power off and the brake on. When no current is flowing in stator coils 10, brake disc 9 attracts magnet 8 and causes magnet 8 to move axially until contact occurs between magnet 8 and brake disc pad 11.

Referring to FIG. 5, actuator 2 is shown with power on and the brake off. When power is applied, the brake is released because the magnetic field of the stator coils 10 overcomes the magnetic brake force and causes magnet 8 to center itself (axially) on the stator coils 10. Magnet 8 is then free to rotate to the requested position (according to the truth table in FIG. 3) and the brake reapplies when the input power is removed.

Figure 6:
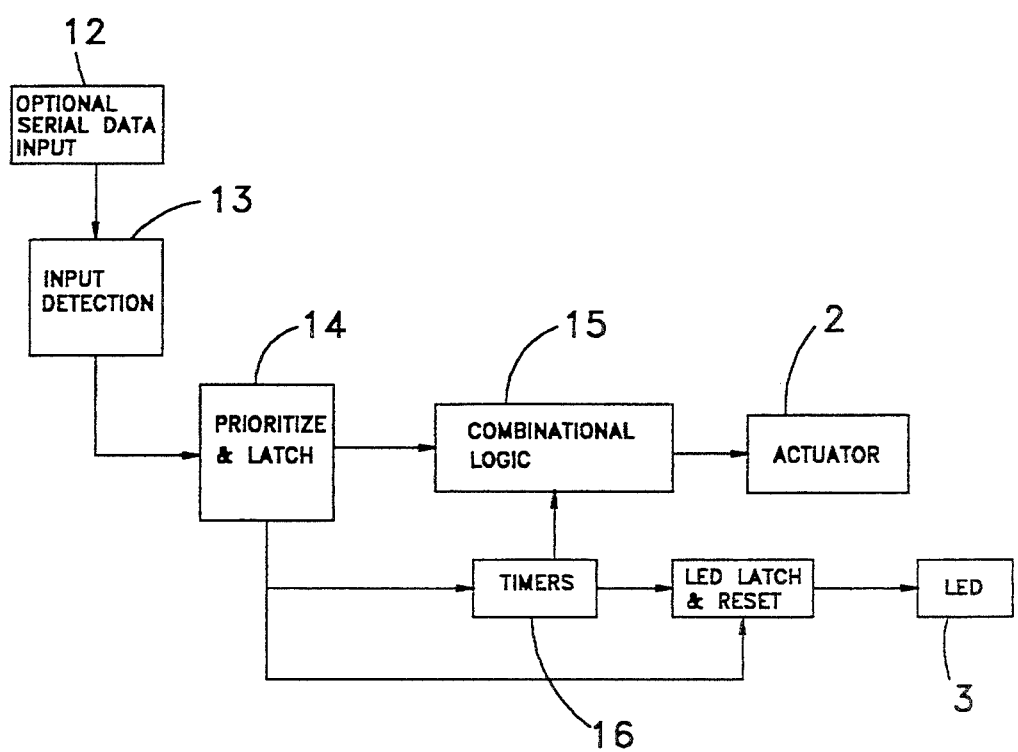
FIG. 6 is a diagram of the control logic circuitry for the actuator and the light source.

FIG. 6 is a block diagram of an exemplary logic circuit used to control the actuator 2 and the LED lamp 3. The inputs levels are monitored for indication of a fault or warning at block 13. Optionally, block 12 provides serial data input through communications with other monitoring devices. Block 14 processes and stores the input change according to a user defined priority. The combinational logic 15 and timers 16 then apply the appropriate signals to actuator 2 for a sufficient period of time to ensure the image is in place. The timers 16 then remove power from actuator 2 and power is applied to LED lamp 3. Total elapsed time from input changes to the light source being powered is generally in the order of 0.3 to 0.5 seconds. The preferred embodiment would contain the logic circuitry of FIG. 6 in a single integrated circuit package to reduce assembly costs and space.

Figure 7:
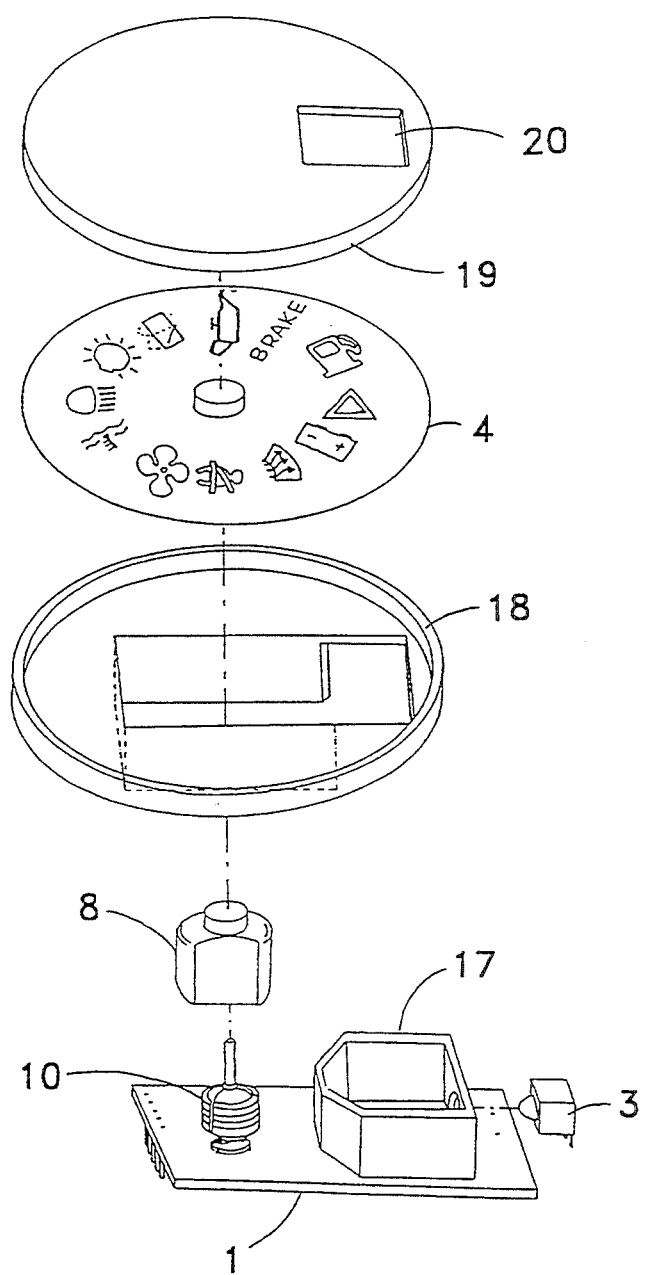
FIG. 7 is an exploded perspective view of an alternate embodiment of the present invention.

Referring to FIG. 7, substrate 1 is the base for the assembly and contains electrical connections. The stator coils 10 and LED lamp 3 are soldered to substrate 1. The integrated circuit may also be soldered to substrate 1 or may be part of another circuit assembly to which substrate 1 is connected. Magnet 8 is placed around the stator coils 10 and is attached to the image strip 4 such that both are free to rotate about the stator coils 10. Into light box 17 which is fixedly attached to substrate 1. Housing 18 and cover 19 are used to enclose the rotating members (magnet 8 and image strip 4) and to provide window opening 20 through which the selected image is viewed.

Those skilled in the art will recognize that substrate 1, housing 18 and cover 19 may individually be incorporated into larger multifunction components within an instrument cluster.

Figure 8:
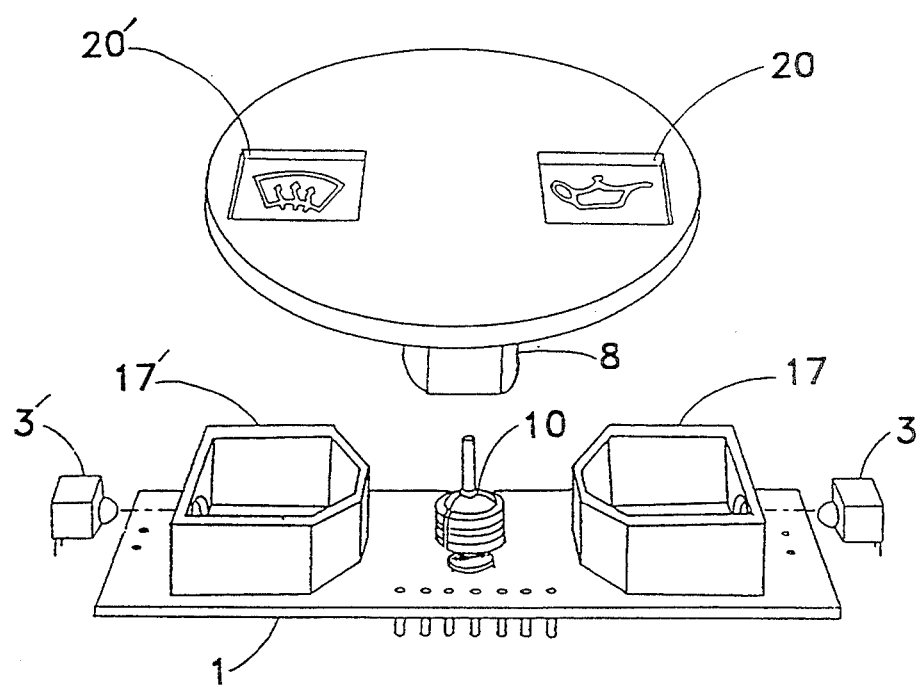
FIG. 8 is a perspective view of the alternate embodiment that shows a plurality of display windows, light sources and light boxes.

Referring now to FIG. 8, the embodiment of FIG. 7 is shown with a plurality LED lamps 3 and 3', a plurality of light boxes 17 and 17' cooperating with a plurality of window openings 20 and 20'. This configuration allows multiple warnings to be displayed or the use of LED lamps 3 and 3' that are different colors. Alternately, different color LED lamps 3 and 3' could be mounted for use with just one light box 17.

One skilled in the art will recognize that the device embodiments disclosed above may be used with or without optical elements to form virtual image displays and so called Heads-Up-Displays.

The preferred actuator design has an input impedance of approximately 20 ohms. This equates to a peak current of 250 ma at +5 VDC. Input power pulses should be from 200 ms to 500 ms in duration. LED Lamp 3 requires typically 20 ma to 30 ma to provide the required intensities.

What is claimed is:

1. An image display arrangement comprising:
   a substrate wherein said substrate acts as a base having an integrated circuit and electrical connections;
   stator coils fixedly attached to said substrate;
   an actuator fixedly attached to said substrate and having two or more inputs which act as connection points for said stator coils and said connection points having inputs of high, low, and floating, whereby six output positions for said actuator are provided and wherein a stator magnetic field is created when current flows through said stator coils;
   a brake disc disposed beneath said stator coils and fixedly attached to said substrate;
   a brake disc pad disposed beneath said stator coils and fixedly attached to said brake disc;
   a light emitting diode (LED) electrically connected to said integrated circuit;
   a magnet having a magnetic field, said magnet disposed around said stator coils wherein said magnet can freely rotate around said stator coils and wherein no current is flowing in said stator coils, said brake disc attracts said magnet and causes said magnet to move axially until contact occurs between said magnet and said brake disc pad and also wherein current is flowing in said stator coils, said brake disc is released by said magnetic field of said stator coils overcoming said magnetic field of said magnet;

an image strip carrier having a series of images and having said image strip fixedly attached to said magnet wherein said image strip can freely rotate around said stator coils;

a light box fixedly attached to said substrate;

a housing fixedly attached to said substrate wherein said housing encloses said actuator, said light emitting diode (LED), said stator coils, said magnet, and said light box;

a cover fixedly attached to said housing having a window opening to view said image strip and to emit light from said light emitting diode (LED).

2. An image display arrangement as recited in claim 1, wherein said image strip is an image disc.

3. An image display arrangement as recited in claim 1, wherein three stator coils are fixedly attached to said substrate.

4. An image display arrangement as recited in claim 1, further including an angled optic.

5. An image display arrangement as recited in claim 1, wherein said actuator has an input impedance of approximately 20 ohms.

6. An image display arrangement as recited in claim 1, further including a reduced magnetic gap creating a high flux level to produce a ratchet or cogging effect of said actuator.

7. An image display arrangement comprising:
a substrate wherein said substrate acts as a base having an integrated circuit and electrical connections;
stator coils fixedly attached to said substrate;
an actuator fixedly attached to said substrate and having two or more inputs which act as connection points for said stator coils and said connection points having inputs of high, low, and floating, whereby six output positions for said actuator are provided and wherein a stator magnetic field is created when current flows through said stator coils;
a brake disc disposed beneath said stator coils and fixedly attached to said substrate;
a brake disc pad disposed beneath said stator coils and fixedly attached to said brake disc;
a light emitting diode (LED) electrically connected to said integrated circuit;
a magnet having a magnetic field, said magnet disposed around said stator coils wherein said magnet can freely rotate around said stator coils and wherein no current is flowing in said stator coils, said brake disc attracts said magnet and causes said magnet to move axially until contact occurs between said magnet and said brake disc pad and also wherein current is flowing in said stator coils, said brake disc is released by said magnetic field of said stator coils overcoming said magnetic field of said magnet;
an image strip carrier having a series of images and having said image strip fixedly attached to said magnet wherein said image strip can freely rotate around said stator coils;
a light box fixedly attached to said substrate;
a housing fixedly attached to said substrate wherein said housing encloses said actuator, said light emitting diode (LED), said stator coils, said magnet, and said light box;
a cover fixedly attached to said housing having a window opening to view said image strip and to emit light from said light emitting diode (LED);
a logic circuit wherein said actuator and said light emitting diode (LED) are controlled by monitoring input levels for indication of a fault or warning with serial data input though communications and other monitoring devices, and whereby said logic circuit processes and stores an input change according to a user defined priority, and combinational logic applies appropriate signals to said actuator for a sufficient period of time to ensure said image is in place wherein said combinational logic removes power from said actuator and power is applied to said light emitting diode (LED).

8. An image display arrangement as recited in claim 7, wherein said image strip is an image disc.

9. An image display arrangement as recited in claim 7, wherein three stator coils are fixedly attached to said substrate.

10. An image display arrangement as recited in claim 7, further including an angled optic.

11. An image display arrangement as recited in claim 7, wherein said actuator has an input impedance of approximately 20 ohms.

12. An image display arrangement as recited in claim 7, further including a reduced magnetic gap creating a high flux level to produce a ratchet or cogging effect of said actuator.

13. An image display arrangement in combination with an instrument cluster comprising:
a substrate wherein said substrate acts as a base having an integrated circuit and electrical connections;
stator coils fixedly attached to said substrate;
an actuator fixedly attached to said substrate and having two or more inputs which act as connection points for said stator coils and said connection points having inputs of high, low, and floating, whereby six output positions for said actuator are provided and wherein a stator magnetic field is created when current flows through said stator coils;
a brake disc disposed beneath said stator coils and fixedly attached to said substrate;
a brake disc pad disposed beneath said stator coils and fixedly attached to said brake disc;
a light emitting diode (LED) electrically connected to said integrated circuit;
a magnet having a magnetic field, said magnet disposed around said stator coils wherein said magnet can freely rotate around said stator coils and wherein no current is flowing in said stator coils, said brake disc attracts said magnet and causes said magnet to move axially until contact occurs between said magnet and said brake disc pad and also wherein current is flowing in said stator coils, said brake disc is released by said magnetic field of said stator coils overcoming said magnetic field of said magnet;
an image strip carrier having a series of images and having said image strip fixedly attached to said magnet wherein said image strip can freely rotate around said stator coils;
a light box fixedly attached to said substrate;

a housing fixedly attached to said substrate wherein said housing encloses said actuator, said light emitting diode (LED), said stator coils, said magnet, and said light box;

a cover fixedly attached to said housing having a window opening to view said image strip and to emit light from said light emitting diode (LED);

a logic circuit wherein said actuator and said light emitting diode (LED) are controlled by monitoring input levels for indication of a fault or warning with serial data input though communications and other monitoring devices, and whereby said logic circuit processes and stores an input change according to a user defined priority, and combinational logic applies appropriate signals to said actuator for a sufficient period of time to ensure said image is in place wherein said combinational logic removes power from said actuator and power is applied to said light emitting diode (LED).

14. An image display arrangement as recited in claim 13, wherein said image strip is an image disc.

15. An image display arrangement as recited in claim 13, wherein three stator coils are fixedly attached to said substrate.

16. An image display arrangement as recited in claim 13, further including an angled optic.

17. An image display arrangement as recited in claim 13, wherein said actuator has an input impedance of approximately 20 ohms.

18. An image display arrangement as recited in claim 13, further including a reduced magnetic gap creating a high flux level to produce a ratchet or cogging effect of said actuator.

* * * * *